Patented Oct. 25, 1932

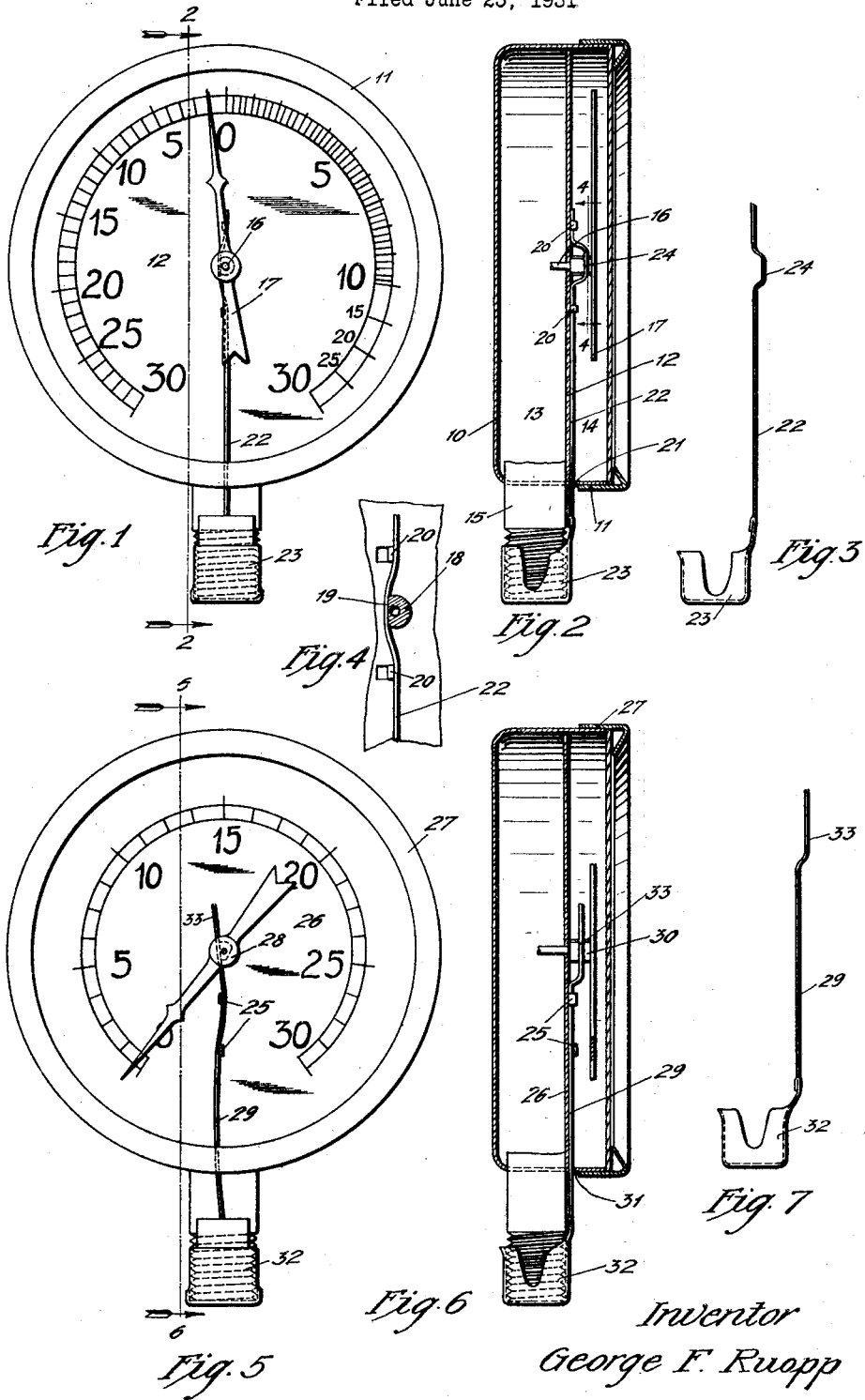
Oct. 25, 1932.  G. F. RUOPP  1,884,264
PROTECTING DEVICE FOR GAUGES
Filed June 23, 1931
Inventor
George F. Ruopp
by Orwig & Hague Attys.

1,884,264

UNITED STATES PATENT OFFICE

GEORGE FREDERICK RUOPP, OF MARSHALLTOWN, IOWA, ASSIGNOR TO MARSHALL-
TOWN MANUFACTURING COMPANY, OF MARSHALLTOWN, IOWA, A CORPORATION
OF IOWA

PROTECTING DEVICE FOR GAUGES

Application filed June 23, 1931. Serial No. 546,279.

This invention relates to pressure gauges of that type employing what is commonly known as the Bourdon spring tube gauge, or any type of gauge in which delicate mechanism is employed for operating the index member. Considerable difficulty has been experienced heretofore in this type of mechanism, due to the fact that rough usage and handling during shipment of the gauge often results in injury to the delicate mechanism, on account of the tendency of the index member to oscillate about its pivotal center.

It is therefore the object of my invention to provide a simple, durable and inexpensive means which may be easily and quickly attached to the pressure gauge at the time the gauge is manufactured and tested, and when so applied provides means whereby the rotatably mounted index member may be yieldably and temporarily supported against rotation. The device is so arranged that it may be easily and quickly removed at the time the instrument is installed; and further so constructed that the device must be removed before installation of the gauge to obviate the possibility of the mechanic installing the instrument forgetting to remove the protecting device.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a front view of a gauge showing the manner in which my preferred form of protecting device is attached.

Figure 2 is a detail sectional view taken on the line 2—2 of Figure 1.

Figure 3 is a side elevation of my improved protecting device.

Figure 4 is a detail sectional view taken on the line 4—4 of Figure 2.

Figure 5 is a front view of a pressure gauge showing a modified form of my protecting device.

Figure 6 is a detail sectional view taken on the line 6—6 of Figure 5; and

Figure 7 is a side elevation of the modified form of my protecting device.

Referring to the accompanying drawing, I have used the reference numeral 10 to indicate the casing of a pressure gauge having a cylindrical wall 11 and open at its front end, said casing having a dial 12 which divides the casing into two compartments 13 and 14. The compartment 13 is provided with the usual gauge mechanism which is provided with outwardly projecting pipe 15 having its outer end screw threaded and adapted to make connection with a suitable pipe line.

Projecting outwardly from the compartment 13 through the dial 12 is a rotatably mounted shaft 16 actuated by the gauge mechanism and designed to support the index 17. Said index has a hub 18 by means of which the index is secured to the shaft 16. The hub 18 has a flattened portion 19. The dial 12 is provided with outwardly projecting lugs 20, one being placed above the shaft 16 and the other one below it a slight distance, as clearly shown in Figures 1 and 4. The lugs are substantially in line with the shaft 16.

The casing 10 is provided with an opening 21 adjacent to the front face of the member 15. A wire 22 projects through the opening 21 and adjacent to the lugs 20 and the flattened portion 19 of the hub 18 to yieldably support the index member in its zero position. The outer end of the wire 22 is connected to a socket 23 placed over the threaded portion of the member 15.

The wire 21 is provided with a looped portion 24 designed to engage the flattened portion 19 in such a manner that torsional strain is applied to the wire at the time it is placed in position. The looped portion also holds the wire in position and prevents it from moving outwardly from the dial 12, and thus prevents it from accidentally disengaging said lugs 20.

The wire 21 is placed in position in the factory after the instrument has been tested, in which position it remains until the instrument is installed, insuring the instrument against injury due to rough usage.

At the time the instrument is installed, it is first necessary to remove the socket portion 23, which is accomplished by moving the said socket portion outwardly from the body of the gauge. The wire 21 is moved longitudinally and outwardly at the same time, and withdrawn through the opening 21, permitting the index member to then move freely. By this arrangement it will be seen that it is impossible to install the instrument without first removing the protecting device.

In Figures 5, 6 and 7 I have illustrated a slightly modified form of my device in which lugs 25 project outwardly from the dial 26 of the gauge 27, said lugs being supported from one side of the hub 28 instead of one lug on each side of the hub, as in the preferred form.

A wire 29 is threaded between the lugs 25 and the flattened portion 20 of the hub 28. The outer end of the wire is threaded through an opening 31 in the casing and secured to a socket member 32. The inner end of the wire 29 has an offset portion 33 designed to prevent lateral disengagement of the wire from the lugs 25. As in my preferred form, the socket member 32 must be removed from the threaded portion of the outwardly extending pipe before the device can be installed.

Thus it will be seen that I have provided a simple, durable and inexpensive protecting device which may be easily and quickly installed in that type of pressure gauges employing a rotatably mounted index member and having an outwardly extending pipe connection, and which is so constructed that the protecting device must be removed before the instrument is installed.

I claim as my invention:

1. The combination of a pressure gauge casing having a connection member, a dial, an index rotatively mounted in front of said dial, said index having a hub, one face of which is flattened, said casing having an opening adjacent to said connection member, a cap covering said connection member, a wire supported through said opening having one end connected to said cap and its opposite end adjacent to the flattened portion of said hub, and means carried by said dial for detachably supporting said wire in position in such a manner that the wire may be removed only by being withdrawn outwardly and longitudinally.

2. The combination of a pressure gauge casing having a connection member, a shaft rotatively mounted in said dial having outwardly projecting lugs, a hub carried by said shaft, an index member carried by said hub, said casing having an opening adjacent to said connection member, a cap detachably covering the outer end of said connection member, a wire extending through said opening having one end connected to said cap and its opposite end threaded between the flattened portion of said hub and said outwardly projecting lugs.

3. The combination of a pressure gauge casing having an outwardly projecting connection member, a shaft rotatively mounted in said dial having outwardly projecting lugs, a hub carried by said shaft, an index member carried by said hub, said casing having an opening adjacent to said connection member, a cap detachably covering the outer end of said connection member, a wire extending through said opening having one end connected to said cap and its opposite end threaded between the flattened portion of said hub and said outwardly projecting lugs, that portion of said wire engaging the flattened portion of said hub being looped outwardly to prevent the wire from being moved outwardly and disengaging the lugs.

4. The combination of a pressure gauge casing having a connection member, a dial, a rotatably mounted index member, detachable means for covering the connection member, and means carried by the last said means for temporarily supporting the index member against rotation, the last said means being removable only upon the removal of said connection covering means.

5. In a device of the class described, a cap adapted to cover the connection of a pressure gauge, and a wire fixed to one edge of said cap and projecting longitudinally therefrom, the free end of said wire having an offset portion to engage an index member of a pressure gauge, for the purposes stated.

GEORGE FREDERICK RUOPP.